UNITED STATES PATENT OFFICE.

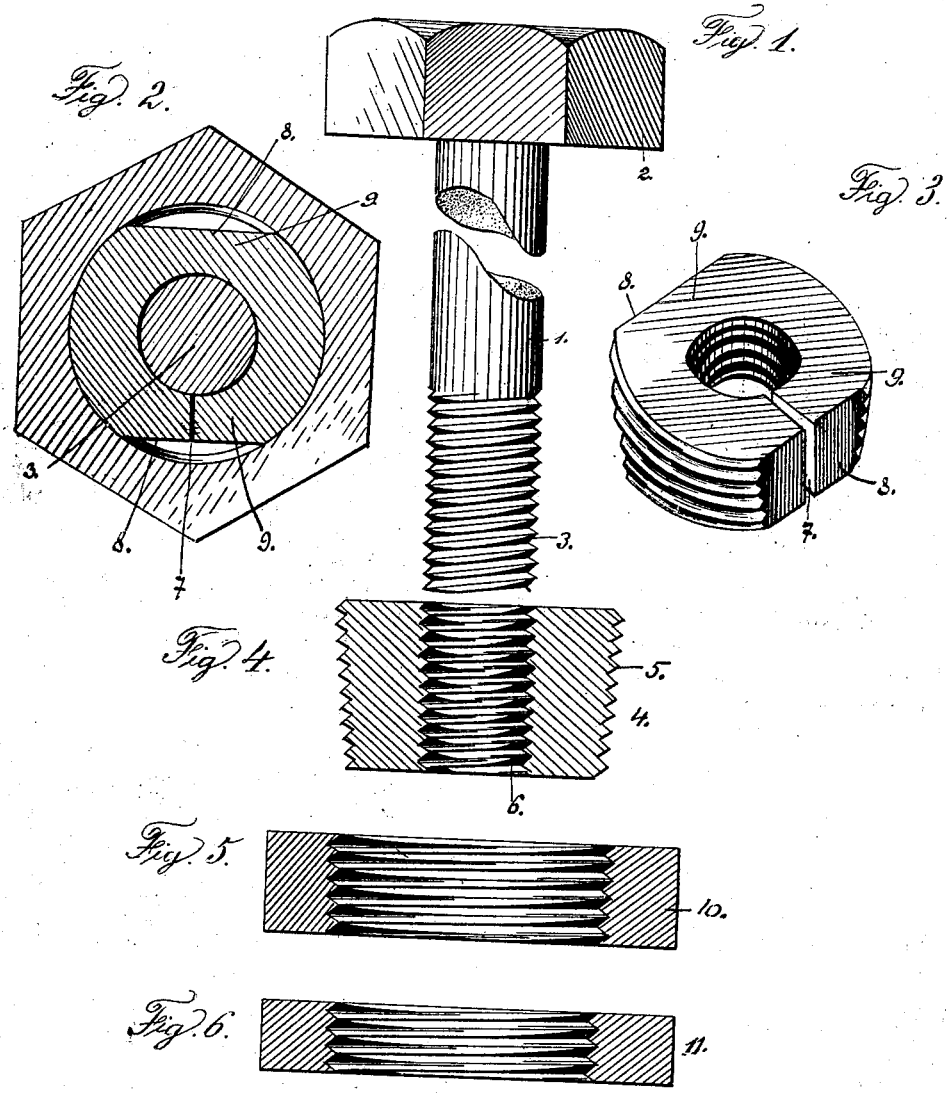

WARREN H. DEVOE, OF PITTSBURG, PENNSYLVANIA.

NUT-LOCK.

No. 854,471.      Specification of Letters Patent.      Patented May 21, 1907.

Application filed May 23, 1906. Serial No. 318,402.

*To all whom it may concern:*

Be it known that I, WARREN H. DEVOE, a citizen of the United States of America, residing at Pittsburg, in the county of Allegheny and State of Pennsylvania, have invented certain new and useful Improvements in Nut-Locks, of which the following is a specification, reference being had therein to the accompanying drawing.

This invention relates to certain new and useful improvements in nut locks, and the invention has for its object to provide simple and positive means for firmly holding a nut or bur upon the end of a bolt. To this end, I have devised a nut lock wherein a tapering exteriorly threaded split nut or bur is used, together with a locking nut and a jam nut, both of which are mounted upon the nut or bur, to lock the same upon the end of a bolt. On account of the tapering of nut or bur, the locking and jam nuts exert an internal pressure upon the tapering nut, thereby securely locking said nut upon the bolt in connection with which it is used.

The detail construction of my improved nut lock will be presently described and then specifically claimed, and reference will now be had to the drawing forming part of this specification, wherein:—

Figure 1 is a plan of a bolt, partly broken away, Fig. 2 is a cross sectional view of the same, illustrating the nut or bur as secured therein by the lock nut, Fig. 3 is a perspective view of the nut or bur, Fig. 4 is a cross sectional view of the same, Fig. 5 is a similar view of the lock nut, and Fig. 6 is a similar view of the jam nut.

In the accompanying drawings, the reference numeral 1 designates a conventional form of bolt having a head 2 and a threaded shank 3. In connection with said bolt, I use a tapering nut 4, exteriorly threaded, as at 5 and interiorly threaded, as at 6. The nut 4 is split as at 7 and provided with two flat sides 8, 8 forming neck portions 9, 9, one of which is intersected by the splitting of the nut. The flat sides 8—8 provide means for the application of the wrench or other implement employed for placing the nut upon the bolt, without danger of battering the threads. By this means the nut can be readily placed upon or removed from the bolt without increasing its thickness over that of an ordinary nut, which is a very material advantage in many locations.

A locking nut 10 and a jam nut 11 are employed to lock the nut 4 upon the bolt 1. The locking nut 10 is first placed upon the nut 4, and as said nut is rotated upon the nut 4, said nut is compressed, thereby exerting an internal pressure, which binds the interior threads of the nut 4 upon the threads of the bolt shank 3. The jam nut 11 is then placed upon the nut 4, to retain the lock nut 10 upon the rear half of the nut 4.

From the foregoing, it will be observed that the threads of the nuts 10 and 11 conform in taper to the tapering threads of the nut 4, thus insuring an equal distribution of pressure upon the nut 4, that tends to firmly bind said nut upon the end of a bolt.

What I claim and desire to secure by Letters Patent, is:—

In a nut lock, the combination with a threaded bolt, of a tapering inner nut threaded externally and internally from end to end and adapted to engage the threads of the bolt and with oppositely located flat faces, said inner nut split on one side throughout its length, the split extending from one flat face thereof into the central threaded opening, and two outer nuts whose combined thickness corresponds to the thickness of the inner nut and both outer nuts mounted upon the tapering inner nut and with threaded bores engaging the tapering inner nut.

In testimony whereof I affix my signature in the presence of two witnesses.

WARREN H. DEVOE.

Witnesses:
    K. H. BUTLER,
    MAX H. SROLOVITZ.